United States Patent [19]
Suzuki et al.

[11] 3,980,822
[45] Sept. 14, 1976

[54] AUTOMATIC BRIGHTNESS CONTROL CIRCUIT

[75] Inventors: Toshio Suzuki; Masaru Sato, both of Tokyo, Japan

[73] Assignee: Sony Corporation, Tokyo, Japan

[22] Filed: Mar. 1, 1974

[21] Appl. No.: 447,329

[30] Foreign Application Priority Data
Feb. 28, 1973 Japan............................ 48-25320[U]

[52] U.S. Cl....................... 178/7.5 R; 178/DIG. 29; 315/383
[51] Int. Cl.² ...................... H04N 5/68; H01J 29/52
[58] Field of Search.................. 178/DIG. 29, 7.5 R, 178/7.5 DC; 358/39; 315/383, 30

[56] References Cited
UNITED STATES PATENTS

| | | | |
|---|---|---|---|
| 3,465,095 | 9/1969 | Hansen et al. | 178/7.5 DC |
| 3,619,705 | 11/1971 | Waybright | 315/383 |
| 3,674,932 | 7/1972 | Griepentrog | 178/7.5 R |
| 3,804,981 | 4/1974 | Avins | 178/7.3 DC |
| 3,848,945 | 11/1974 | Holzrichter | 315/30 |

Primary Examiner—John C. Martin
Attorney, Agent, or Firm—Lewis H. Eslinger; Alvin Sinderbrand

[57] ABSTRACT

A multiple automatic brightness control for a television receiver including a first automatic brightness limiter (ABL) circuit responsive only to relatively long duration changes in brightness-producing current and a second ABL circuit responsive to brightness-producing current changes of shorter duration than the first ABL circuit. Both ABL circuits have threshold levels below which they are not responsive to brightness-producing current changes, but the threshold level of the second ABL circuit is higher than that of the first so that, while the second ABL circuit responds more quickly than the first, it does so only for higher amplitude changes in the brightness-producing current.

7 Claims, 4 Drawing Figures

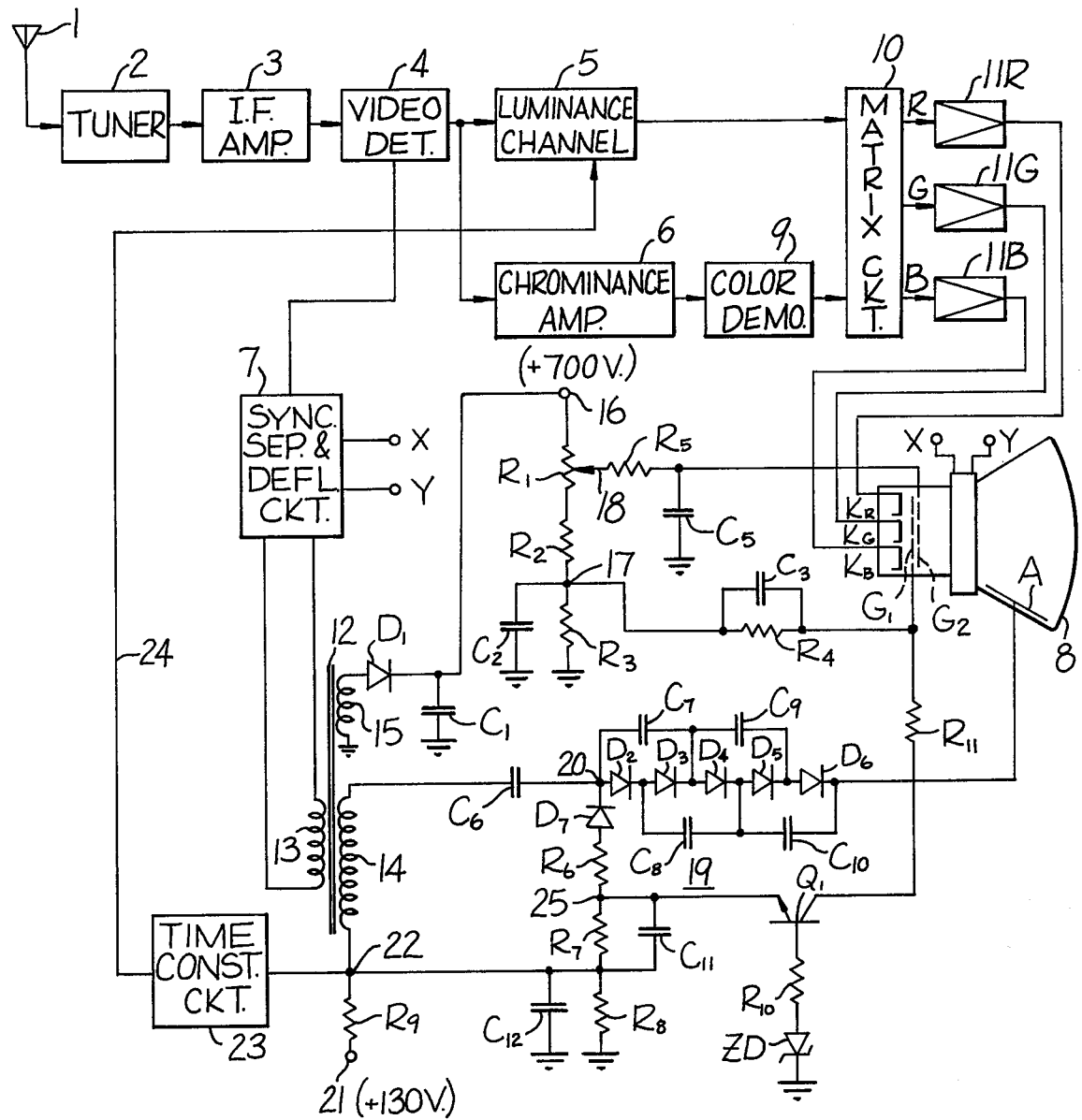
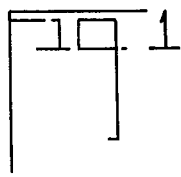

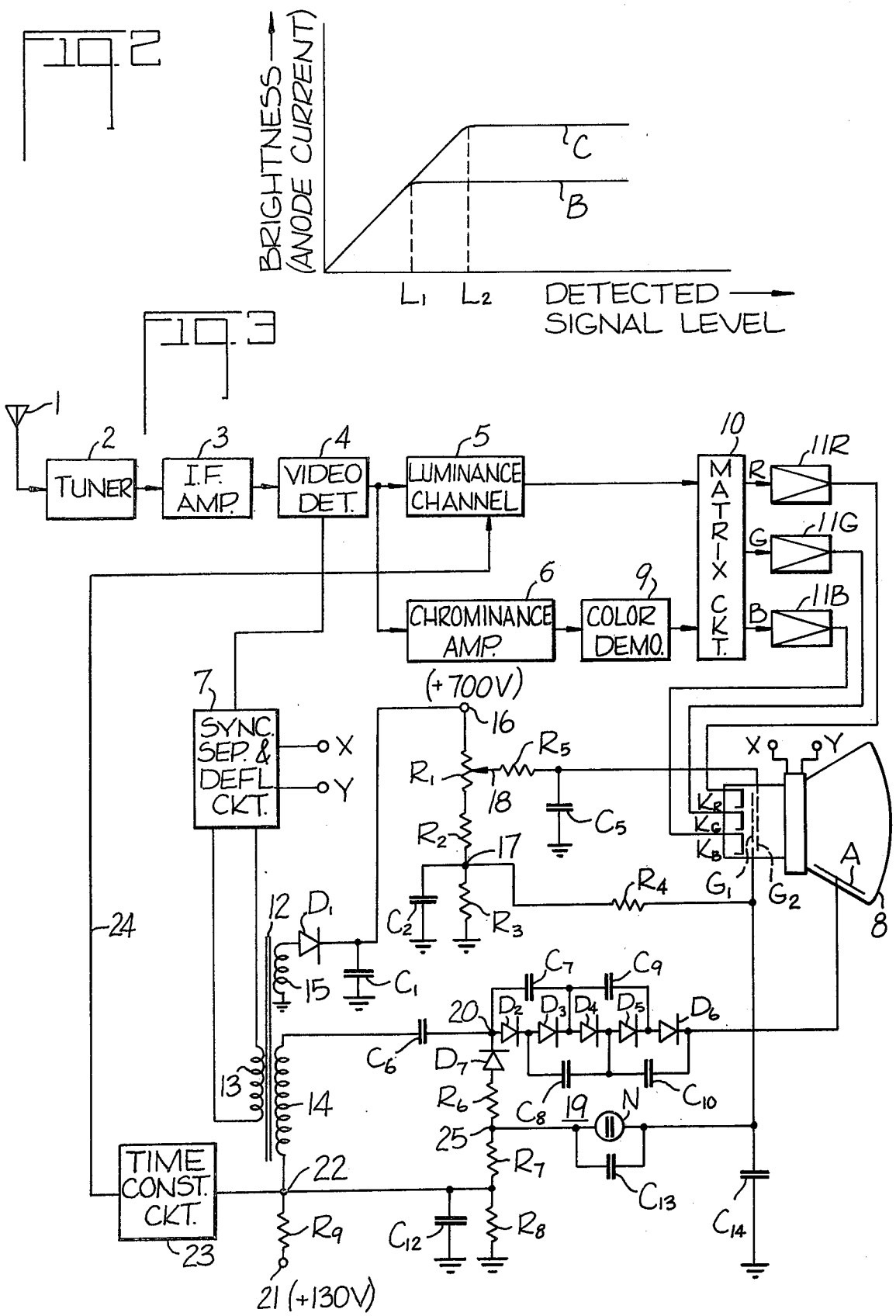

AUTOMATIC BRIGHTNESS CONTROL CIRCUIT

BACKGROUND OF THE INVENTION

1. Field of the Invention

This invention relates to automatic brightness limiter (ABL) circuits and particularly to a combination of ABL circuits, one of which is responsive to brightness changes at a lower level than another but requiring the brightness changes to which it responds to last longer than the higher level changes to which the other ABL circuit responds.

2. The Prior Art

In a television receiver, it is desirable to limit the brightness of images produced on the screen of a cathode ray tube. The brightness is related to the anode current of the cathode ray tube, and this current must be produced by a high voltage power supply. The high voltage power supply may be damaged if it is required to supply too high a current for too long a time. Also, the high anode current may damage the fluorescent screen of the cathode ray tube. Whether or not there is any damage to the power supply or the cathode ray tube, excessively bright images may cause the viewers to feel eyestrain. In the form of sudden flashes that cause no other problem, they may simply be objectionable to the viewer.

The foregoing disadvantages of unnecessarily high brightness levels have been recognized in the past, and ABL circuits have been provided to control the brightness, especially in color television receivers. Since the brightness is proportional to the anode current of the cathode ray tube, such ABL circuits have usually been coupled to a circuit through which anode current of the cathode ray tube flows and have responded by controlling or limiting the luminance signal when the anode current rose above a threshold level.

It is desirable theoretically that an ABL circuit respond without delay, but actually such an ABL circuit is not possible. One reason it is not possible is that the anode current is not continuous but drops to zero during each horizontal and vertical blanking interval. Thus, even in the simplest form, the anode current may be considered to approximate a pulse wave. If the ABL circuit would be responsive to such rapid changes of anode current, or brightness, it could cause the quality of the reproduced television images to be deteriorated. Such deterioration could appear as blurred areas of darkness and light.

Therefore, it has been customary to design prior art ABL circuits to respond only to brightness levels so that only changes in brightness levels that are slower than the vertical scanning period are detected and accounted for. The time constant of an ABL circuit may have a value of 50 to 60 milli-seconds, which is about three or four times the duration of a vertical scanning period, so that the ABL circuit is not influenced by a change in brightness that lasts for only a single line scanning interval or less, or even by a change in brightness that lasts for a single vertical scanning interval. Such an ABL circuit is referred to as an averaging-type ABL circuit.

Averaging-type ABL circuits have several disadvantages. They cannot respond to rapid or momentary brightness changes, such as occur when the tuner, or channel selector, of a receiver is actuated to shift from one operating channel to another. When the tuner passes through unused frequency bands, the screen of the cathode ray tube may receive momentary flashes of high brightness. The period for passing through such unused frequency bands is usually short and is in the order of 20 milli-seconds, so that ABL circuits with time constants of 50 milli-seconds or more do not have time to respond. Other flashes of brightness too short to be controlled by averaging-type ABL circuits occur, for example, when the main power switch is actuated and when there are troubles in the driving circuits for the cathode ray tube.

It is an object of the present invention to provide an automatic brightness limiter circuit capable of responding quickly to limit sudden large brightness increases in an image display device and more slowly to limit brightness increases of lesser intensity.

It is another object of this invention to provide a novel automatic brightness control circuit in which first and second ABL circuits are utilized.

It is a further object of this invention to provide an improved ABL circuit which is responsive to a rapid or momentary change in brightness of images reproduced on the screen of a cathode ray tube.

Another object of the invention is to provide a combination of two automatic brightness limiter circuits coupled to a brightness current circuit, the first limiter circuit responding to brightness current in excess of a first threshold level and comprising a first time constant circuit to limit to a first value the maximum frequency to which the first limiter circuit can respond, and the second limiter circuit responding to brightness current only in excess of a higher threshold level than the first threshold level and comprising a second time constant circuit having a lower time constant value than the first time constant circuit to be responsive to frequencies higher than the maximum response frequency of the first time constant circuit.

SUMMARY OF THE INVENTION

The automatic brightness control circuit according to the present invention includes a first ABL circuit having a relatively long time constant value so that it responds to brightness current that exceeds the relatively low threshold value, provided the current remains in excess of that value for a long enough time. The control circuit also includes a second ABL circuit having a relatively short time constant so that it can respond to excess brightness signals more quickly than the first ABL circuit but having a higher threshold level than the first ABL circuits so that the brightness signals to which the second ABL circuit responds must be such as would produce higher brightness.

BRIEF DESCRIPTION OF THE DRAWINGS

FIG. 1 is a schematic circuit diagram, partially in block form, of part of a color television receiver including video and brightness circuits and an automatic brightness control circuit according to the present invention.

FIG. 2 is a graph illustrating the difference in operation of the two ABL circuits in the automatic brightness control circuit in FIG. 1.

FIG. 3 is a schematic circuit diagram generally similar to FIG. 1 but illustrating a different embodiment of an automatic brightness control circuit.

DETAILED DESCRIPTION OF THE INVENTION

Figure 4:
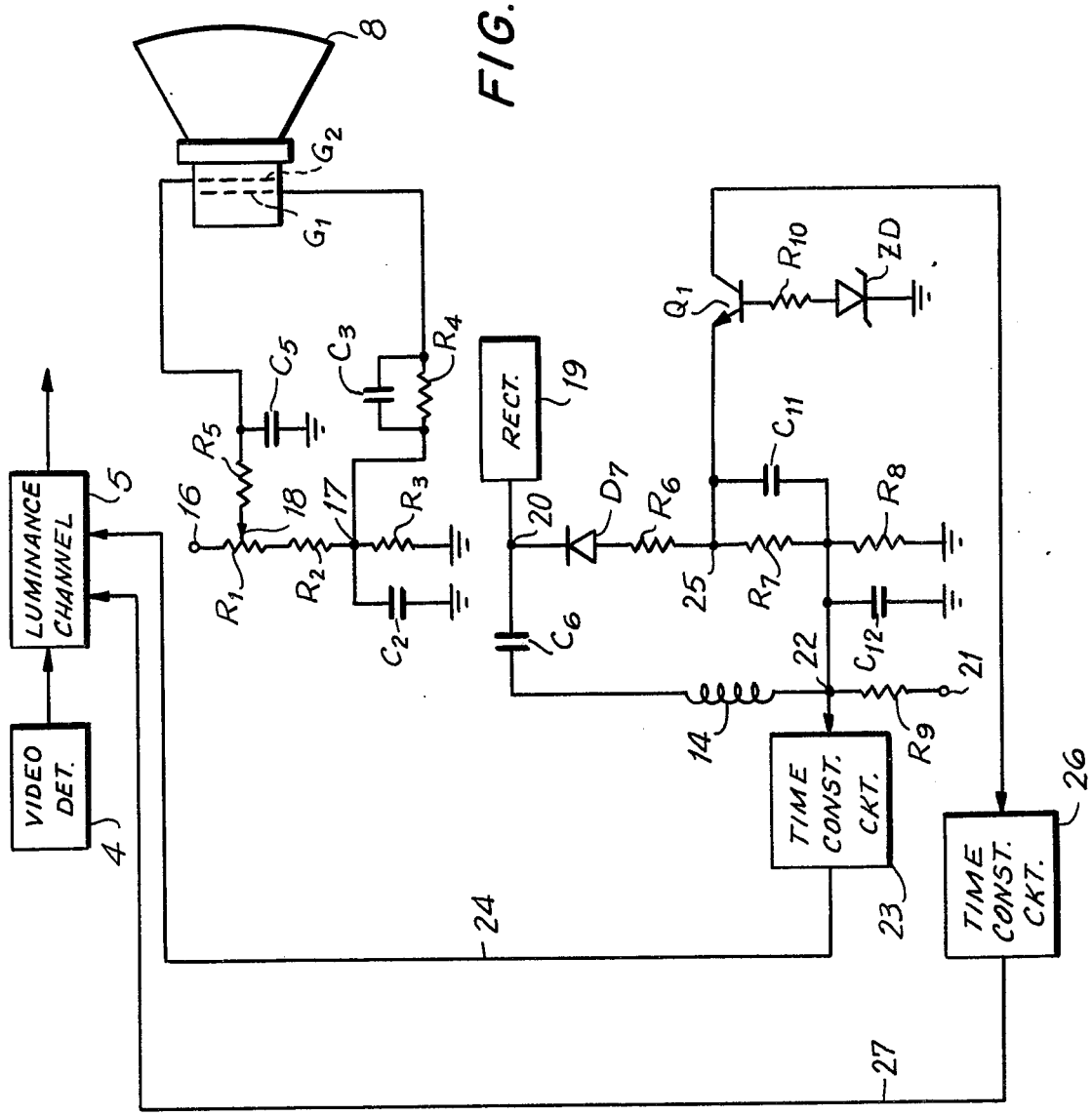
FIG. 4 is an alternative embodiment of the brightness control circuit according to this invention.

The color television receiver components illustrated in FIG. 1 include an antenna 1 connected to a tuner 2 that selects the television channel to be viewed. The output of the tuner is connected to an I.F. amplifier 3 that supplies signals to a video detector 4. One output of the detector 4 is connected to a luminance signal channel 5 and to a chrominance amplifier 6 in a chrominance channel. The detector 4 also supplies signals to a synchronizing signal separator and deflection circuit 7. This circuit supplies horizontal and vertical deflection signals via circuits X and Y to a deflection yoke on a cathode ray picture tube 8.

The output of the chrominance amplifier 6 is applied to a color demodulator 9 to demodulate color difference signals R-Y, G-Y and B-Y. The demodulated color difference signals are applied along with the luminance signals from the luminance channel 5 to a matrix circuit 10 to produce separate red, green, and blue color component signals. These are amplified by amplifiers 11R, 11G and 11B, respectively and are applied to cathodes $K_R$, $K_G$, and $K_B$ of the cathode ray tube 8 to generate a color television image.

This invention deals with a luminance signal level controlling circuit, the main circuit configuration of which is depicted in the figure.

The reference numeral 12 designates a so-called flyback transformer which is energized with horizontal flyback pulses from the deflection circuit 7. The transformer 12 includes a primary winding 13, a secondary winding 14 and a third winding 15. The flyback pulses obtained across the third winding 15 are rectified and smoothed by a diode $D_1$ and a capacitor $C_1$, and a direct voltage of several hundred volts, for example 700 V, is obtained at a terminal 16. This terminal is used as a direct voltage supply terminal for the electrodes of the cathode ray tube 8 as explained hereinafter. A potentiometer $R_1$ and two resistors $R_2$ and $R_3$ are connected in series between the terminal 16 and the ground, and a capacitor $C_2$ is connected in parallel with the resistor $R_3$.

The resistors $R_1$, $R_2$ and $R_3$ operate as voltage dividing resistors, and a connection point 17 between the resistors $R_2$ and $R_3$ is connected to a first grid $G_1$ of the cathode ray tube 8 via a parallel circuit of a resistor $R_4$ and a capacitor $C_3$ whereby the first grid $G_1$ is biased at a first appropriate DC voltage.

A variable tap 18 of the potentiometer $R_1$ is connected to a second grid $G_2$ of the cathode ray tube 8 via a low pass filter composed of a resistor $R_5$ and a capacitor $C_5$ whereby the second grid $G_2$ is biased at a second appropriate direct voltage.

The flyback pulses obtained across the secondary winding 14 are applied to a high voltage rectifier circuit 19 through a coupling capacitor $C_6$ and a terminal 20. The high voltage rectifier circuit 19 shown in FIG. 1 as an example includes five diodes $D_2 - D_6$ and four capacitors $C_7 - C_{10}$ and forms a voltage quintupler type rectifier. The high output direct voltage from the rectifier circuit 19 is applied to an anode A of the cathode ray tube 8.

A diode $D_7$ and resistors $R_6 - R_8$ are connected in series between the terminal 20 and the ground, and the resistors $R_7$ and $R_8$ are connected in parallel with capacitors $C_{11}$ and $C_{12}$, respectively. These capacitors $C_{11}$ and $C_{12}$ are used as ripple-eliminating elements for the horizontal signal frequency. A terminal 21 from a direct voltage source of about 130 V. is connected to the secondary winding 14 via a resistor $R_9$, and a connection point 22 between the secondary winding 14 and the resistor $R_9$ is connected to a connection point between the resistors $R_7$ and $R_8$.

In this circuit arrangement, a first control voltage corresponding to the change of brightness of the reproduced images on the screen of the cathode ray tube 8 is detected at the point 22 and is obtained therefore in a manner explained in detail hereinafter. This first control voltage is applied to the luminance channel 5 via a first time constant circuit 23 and a line 24 in order to control the signal level in the luminance channel. The circuit for controlling the signal level in the luminance channel 5 may be of a type well known in the prior art as being applicable for that purpose.

The circuit of FIG. 1 further includes a switching transistor $Q_1$, the emitter of which is connected to a connection point 25 between the resistors $R_6$ and $R_7$. The base of the transistor $Q_1$ is connected to ground via a resistor $R_{10}$ and a zener diode ZD. The collector of the transistor $Q_1$ is connected to the first grid $G_1$ via a resistor $R_{11}$.

A second control voltage derived from the connection point 25 is applied to the first grid $G_1$ via the switching transistor $Q_1$ and a second time constant circuit, which consists mainly of the resistors $R_4$ and $R_{11}$ and the capacitor $C_3$ as explained in detail hereinafter.

In the operation of the circuit of FIG. 1, a part of the anode current of the cathode ray tube 8 flows through the low voltage source terminal 21 to the anode A of the cathode ray tube 8 via the resistor $R_9$, the point 22, the resistors $R_7$ and $R_6$, the diode $D_7$, and the rectifier circuit 19. Another part of the anode current for the cathode ray tube flows from the ground to the anode A via the resistors $R_8$, $R_7$ and $R_6$, the diode $D_7$, and the rectifier 19. Both parts of the anode current of the cathode ray tube 8 are carried by the electron beams from the cathodes $K_R$, $K_G$, and $K_B$ and are returned to ground through the amplifiers 11R, 11G and 11B. Thus, both parts of the anode current flow in partially overlapping closed loops.

The voltage at the point 22 changes in response to the anode current, and as the anode current increases in proportion to brightness of images reproduced on the screen of the cathode ray tube, the voltage at the point 22 changes in response to brightness of images reproduced on the screen. The voltage across the resistor $R_9$ is partly the result of one part of the anode current for the tube 8 and the voltage across the resistor $R_8$ is partly the result of the other part of the anode current, but both parts of the anode current flow through the resistor $R_7$. Therefore, the voltage at the point 22 goes down when the brightness of the image increases and the anode current increases.

The voltage change thereby detected and obtained at the point 22 is applied as a first level control voltage to the luminance channel 5 via the first time constant circuit 23 and the line 24. The circuit 23 is of the low pass, or integrating, type, and its time constant is selected to be long enough so that the first level controlling operation for the luminance channel 5 is performed only when the brightness of the reproduced images remains at a higher level than a first threshold level for a relatively long period determined by the circuit 23. This is equivalent to saying that the circuit 23 would not pass signals above a certain relatively low frequency. As an example, the time constant of the circuit 23 is normally selected to be 50 - 60 milliseconds, which is a typical time constant value for a conventional level control circuit in the prior art. The first threshold level is selected to be relatively low so that the level controlling operation becomes effective before the level of brightness of the reproduced images goes too high. The level controlling operation so far described is well known in the prior art as a conventional automatic brightness control (ABL) circuit.

According to the present invention a second level controlling or ABL circuit is provided. First of all, the voltage change at the point 25 is detected by the switching transistor $Q_1$ which forms a second threshold circuit together with the zener diode ZD connected in the base circuit thereof, and this second threshold level is selected to be much higher than the first threshold level of the first level controlling circuit mentioned above. The voltage at the point 25 changes in response to the anode current in the same manner as that at the point 22, and the voltage level at the point 25 is so high under normal operating conditions that the switching transistor $Q_1$ is non-conductive. However, when, for example, the tuning control of the tuner 2 of the receiver is operated and the brightness of the reproduced images suddenly increases to a high level, the anode current of the cathode ray tube 8 also increases in the same manner, the voltage level at the point 25 goes down below the threshold level of the second threshold circuit mentioned above so that the switching transistor $Q_1$ detects the change in voltage level at the point 25 and is made conductive. When the switching transistor $Q_1$ is made conductive, the voltage change at the point 25 is conducted through the transistor $Q_1$ to the collector and applied to the first grid $G_1$ of the cathode ray tube 8 via the second time constant circuit. The capacitance value of the capacitor $C_2$ is selected to be large enough to keep the voltage at the connection point between the resistors $R_2$ and $R_3$ substantially constant, so that the second time constant is mainly determined by the resistors $R_4$ and $R_{11}$ and the capacitor $C_3$. This time constant circuit is also of the low pass, or integrator, type. As an example, the resistance values of $R_4$ and $R_{11}$ may be 470K and 10K, respectively, and the capacitor $C_3$ may have a capacitance of $0.0047\mu f$. The second time constant is then approximately 50 microseconds ($\mu S$), which means that this second time constant is capable of passing signals of much higher frequency than the circuit 23.

When the anode current suddenly increases sufficiently, the collector voltage of the transistor $Q_1$ and, therefore, the voltage at the first grid $G_1$ of the cathode ray tube 8 decreases so as to control or limit the anode current, and such a control operation is performed with a time constant in the order of $50\mu S$. Thus, while the second level controlling, or ABL, circuit is operable only when the anode current of the cathode ray tube increases a relatively large amount, the circuit is effective even if the anode current increases rapidly or momentarily.

In the example just described, the second level controlling, or ABL, circuit is provided to control the voltage at the first grid $G_1$ of the cathode ray tube 8, but it is to be understood that an alternative circuit can be provided to control the signal level in the luminance channel 5. In such an alternative circuit, as shown in FIG. 4, the collector of the transistor $Q_1$ is connected to the luminance channel 5 via a second time constant circuit 26 and a line 27.

Referring now to FIG. 2, curve B designates the operating characteristic of the first level controlling, or ABL, circuit, and curve C designates the operating characteristic of the second level controlling, or ABL, circuit described hereinafter. According to the curve B, the first ABL circuit is effective at the first threshold level $L_1$. According to the curve C, the second ABL circuit is effective at the second level $L_2$, which is higher than the first threshold level $L_1$.

It is to be noted that the characteristic curves B and C of FIG. 2 drawn with the understanding that the detected signal levels are maintained long enough relative to the first and second time constants of the first and second ABL circuits, respectively, to allow the time constant circuits to reach equilibrium.

Referring now to FIG. 3, there is shown another embodiment according to the present invention, and the same reference characters are used to designate elements that are the same as those in FIG. 1.

The main difference between the circuits of FIGS. 1 and 3 is that a neon tube N in FIG. 3, which is well known in the prior art as a typical threshold device, is substituted for the transistor $Q_1$ in FIG. 1.

Another difference between the two embodiments is the construction of the second time constant circuit. In FIG. 3 the second time constant circuit consists mainly of the internal impedance of the neon tube N, a capacitor $C_{13}$ connected in parallel with the neon tube, and a capacitor $C_{14}$ connected between the first grid $G_1$ and the ground. An example of typical values for these components is: capacitance values of $0.1\mu f$ and $0.068\mu f$ for the capacitors $C_{13}$ and $C_{14}$. The second time constant is then approximately 50 micro-seconds ($\mu S$).

As the circuit construction of FIG. 3 is simpler than that of FIG. 1, the cost of the circuit can be lower than that of FIG. 1. (Neon tube is much cheaper than the sum of a transistor and a zener diode)

The operation of the circuit of FIG. 3 is also similar to that of the circuit in FIG. 1 with the neon tube N becoming conductive when it detects a sufficient decrease in voltage at the point 25 relative to the voltage at the grid $G_1$ to cause the neon tube to become suddenly conductive. This causes the voltage at the grid $G_1$ to drop in an amount related to the decrease of the voltage at the point 25 below the threshold level at which the neon tube N becomes conductive.

The circuit of FIG. 3 can be modified in a manner analogous to the alternative embodiment shown in FIG. 4. That is, the neon tube can be connected to the luminance channel 5 via the second time constant circuit 26 so as to control the signal level in the luminance channel.

It will be apparent that many modifications and variations could be effected without departing from the spirit and scope of the novel concepts of this invention.

What is claimed is:
1. An automatic brightness limiter for a cathode ray tube, comprising:
   A. a brightness current circuit through which flows a current proportional to the brightness of an image displayed on said cathode ray tube;
   B. brightness control means responsive to control signals applied thereto for controlling the brightness of said displayed image;
   C. a first automatic brightness limiter circuit coupled to said brightness current circuit to respond to brightness current in excess of a first threshold brightness current level for producing a first control signal to limit said brightness current to said first threshold level, said first automatic brightness limiter circuit comprising a first time constant circuit through which said first control signal is applied to said brightness control means;

D. a second automatic brightness limiter circuit coupled to said brightness current circuit to respond to brightness current only in excess of a second threshold brightness current level higher than said first threshold level for producing a second control signal to limit said brightness current to said second threshold level, said second automatic brightness limiter circuit comprising a second time constant circuit having a lower time constant value than said first time constant circuit and through which said second control signal is applied to said brightness control means such that said brightness control means is responsive to second control signal frequencies higher than the maximum frequency of said first control signal; and in which said brightness current circuit includes:

a. a source of said brightness current; and b. a voltage divider connected to said source of brightness current, said first automatic brightness limiter circuit being connected to a first connection point on said divider and said second automatic brightness limiter circuit being connected to a second connection point on said divider, said second point being positive relative to said first point.

2. An automatic brightness limiter for a cathode ray tube, comprising:

A. a brightness current circuit through which flows a current proportional to the brightness of an image displayed on said cathode ray tube;

B. a first automatic brightness limiter circuit coupled to said brightness current circuit to respond to brightness current in excess of a first threshold brightness current level and to limit said brightness current to said first threshold level, said first automatic brightness limiter circuit comprising a first time constant circuit to limit the maximum frequency to which said first automatic brightness limiter circuit can respond to a first value; and C. a second automatic brightness limiter circuit coupled to said brightness current circuit to respond to brightness current only in excess of a second threshold brightness current level higher than said first threshold level to limit said brightness current to said second threshold level, said second automatic brightness limiter circuit comprising a second time constant circuit having a lower time constant value than said first time constant circuit to be responsive to frequencies higher than said maximum frequency of said first time constant circuit, and further comprising a transistor having an emitter connected to a connection point in said brightness current circuit, a base connected to a source of reference voltage, and a collector connected to a brightness-controlling terminal.

3. The invention as defined in claim 2 comprising, in addition, a luminance circuit comprising said brightness-controlling terminal.

4. An automatic brightness control circuit of a television receiver comprising:

A. a cathode ray tube comprising anode, grid, and cathode electrodes wherein video signals are applied to the cathode of said cathode ray tube;

B. a signal channel for applying video signals to the cathode ray tube to reproduce images thereon;

C. a high voltage circuit for applying a high voltage to the anode of said cathode ray tube to cause brightness current to flow between said anode and cathode electrodes;

D. brightness current detecting means connected to said high voltage circuit for detecting brightness current of said cathode ray tube;

E. a first control circuit connected to said current detecting means for limiting brightness of the images reproduced on said cathode ray tube, said first control circuit comprising a first time constant and being operable only when said brightness current exceeds a first threshold level, said first control circuit is connected to said signal channel for controlling the gain thereof; and F. a second control circuit connected to said current detecting means for limiting brightness of the images reproduced on said cathode ray tube, said second control circuit comprising a second time constant and being operable only when said brightness current exceeds a second threshold level, said first time constant being greater than said second time constant, and said first threshold level being lower than said second threshold level, said second control circuit is connected to the grid of said cathode ray tube for controlling the voltage thereof.

5. An automatic brightness control circuit of a television receiver comprising:

A. a cathode ray tube comprising anode, grid, and cathode electrodes wherein video signals are applied to the cathode of said cathode ray tube;

B. a signal channel for applying video signals to the cathode ray tube to reproduce images thereon;

C. a high voltage circuit for applying a high voltage to the anode of said cathode ray tube to cause brightness current to flow between said anode and cathode electrodes;

D. brightness current detecting means connected to said high voltage circuit for detecting brightness current of said cathode ray tube;

E. a first control circuit connected to said current detecting means for limiting brightness of the images reproduced on said cathode ray tube, said first control circuit comprising a first time constant and being operable only when said brightness current exceeds a first threshold level;

F. a second control circuit connected to said current detecting means for limiting brightness of the images reproduced on said cathode ray tube, said second control circuit comprising a second time constant and being operable only when said brightness current exceeds a second threshold level, said first time constant being greater than said second time constant, and said first threshold level being lower than said second threshold level; and both said first and second control circuits are connected to said signal channel for controlling the gain thereof.

6. An automatic brightness control circuit of a television receiver comprising:

A. a cathode ray tube comprising anode, grid, and cathode electrodes;

B. a signal channel for applying video signals to the cathode ray tube to reproduce images thereon;

C. a high voltage circuit for applying a high voltage to the anode of said cathode ray tube to cause brightness current to flow between said anode and cathode electrodes;

D. brightness current detecting means connected to said high voltage circuit for detecting brightness current of said cathode ray tube;

E. a first control circuit connected to said current detecting means for limiting brightness of the images reproduced on said cathode ray tube, said first control circuit comprising a first time constant and being operable only when said brightness current exceeds a first threshold level; and F. a second control circuit connected to said current detecting means for limiting brightness of the images reproduced on said cathode ray tube, said second control circuit comprising a second time constant and being operable only when said brightness current exceeds a second threshold level, said first time constant being greater than said second time constant, and said first threshold level being lower than said second threshold level, in which said second control circuit comprises a switching transistor having a base connected to a source of reference voltage and an emitter connected to said current detecting means to cause said transistor to be conductive when said brightness current exceeds said second threshold level.

7. An automatic brightness control circuit of a television receiver comprising:

A. a cathode ray tube comprising anode, grid, and cathode electrodes;

B. a signal channel for applying video signals to the cathode ray tube to reproduce images thereon;

C. a high voltage circuit for applying a high voltage to the anode of said cathode ray tube to cause brightness current to flow between said anode and cathode electrodes;

D. brightness current detecting means connected to said high voltage circuit for detecting brightness current of said cathode ray tube;

E. a first control circuit connected to said current detecting means for limiting brightness of the images reproduced on said cathode ray tube, said first control circuit comprising a first time constant and being operable only when said brightness current exceeds a first threshold level; and F. a second control circuit connected to said current detecting means for limiting brightness of the images reproduced on said cathode ray tube, said second control circuit comprising a second time constant and being operable only when said brightness current exceeds a second threshold level, said first time constant being greater than said second time constant, and said first threshold level being lower than said second threshold level, in which said second control circuit comprises: a neon tube coupled to said brightness current detecting means, and said second time constant being determined by said neon tube and capacitive means connected to said neon tube.

* * * * *